United States Patent [19]

Solomon et al.

[11] 3,954,542

[45] May 4, 1976

[54] LABELING MACHINE

[75] Inventors: William H. Solomon; John R. Davies; Carrel M. Forward, all of Grand Rapids, Mich.

[73] Assignee: Oliver Machinery Company, Grand Rapids, Mich.

[22] Filed: Aug. 11, 1970

[21] Appl. No.: 63,199

Related U.S. Application Data

[62] Division of Ser. No. 692,104, Dec. 20, 1967, Pat. No. 3,586,570.

[52] U.S. Cl. .......... 156/360; 83/80; 156/64; 156/363; 156/379; 156/521; 156/567; 156/DIG. 11; 214/1 BD

[51] Int. Cl.[2] .......... B32B 31/04

[58] Field of Search .......... 156/64, 379, 360, 362, 156/566, 567, 521, DIG. 11, 363; 83/80; 214/1 BD

[56] References Cited

UNITED STATES PATENTS

| | | | |
|---|---|---|---|
| 2,602,560 | 7/1952 | Pargh | 156/379 X |
| 2,806,621 | 9/1957 | Drennan | 156/567 X |
| 3,064,714 | 11/1962 | Flood | 156/567 X |
| 3,252,849 | 5/1966 | Schneider | 156/363 |
| 3,553,041 | 1/1971 | Von Hofe | 156/378 |

*Primary Examiner*—Edward G. Whitby
*Attorney, Agent, or Firm*—Price, Heneveld, Huizenga & Cooper

[57] ABSTRACT

A labeling machine, system, and method capable of accommodating offset printed label tapes or other label tapes having discontinuities between the individual labels of a repeat print pattern, with feeding and severing such in controlled fashion utilizing a printed indicia code and a two stage feeding and cutting cycle, while uniquely securing and advancing articles or containers to be labeled with novel equipment, both in a manner to allow extremely accurate and dependable label application and subsequent label verification on the article as well as label position checking, and with discharge means positively governing discharge of the labeled articles according to acceptability or non-acceptability.

15 Claims, 25 Drawing Figures

INVENTORS
WILLIAM H. SOLOMON
JOHN R. DAVIES
CARREL M. FORWARD
BY
Price, Heneveld, Huizenga & Cooper
ATTORNEYS INVENTORS
WILLIAM H. SOLOMON
JOHN R. DAVIES
BY CARREL M. FORWARD
Price, Heneveld
Huizenga & Cooper
ATTORNEYS INVENTORS
WILLIAM H. SOLOMON
JOHN R. DAVIES
CARREL M. FORWARD
BY Price, Heneveld
Huizenga & Cooper
ATTORNEYS INVENTORS
WILLIAM H. SOLOMON
JOHN R. DAVIES
CARREL M. FORWARD
BY
Price, Heneveld
Huizenga & Cooper
ATTORNEYS INVENTORS
WILLIAM H. SOLOMON
JOHN R. DAVIES
CARREL M. FORWARD
BY Price, Heneveld
Huizenga & Cooper
ATTORNEYS INVENTORS
WILLIAM H. SOLOMON
JOHN R. DAVIES
CARREL M. FORWARD
BY Price, Heneveld
Huizenga & Cooper
ATTORNEYS INVENTORS
WILLIAM H. SOLOMON
JOHN R. DAVIES
CARREL M. FORWARD
BY
Price, Heneveld, Huizenga & Cooper
ATTORNEYS INVENTORS
WILLIAM H. SOLOMON
JOHN R. DAVIES
CARREL M. FORWARD
BY Price, Heneveld
Huizenga & Cooper
ATTORNEYS

INVENTORS
WILLIAM H. SOLOMON
JOHN R. DAVIES
CARREL M. FORWARD

BY Price, Heneveld, Huizenga & Cooper

ATTORNEYS

LABELING MACHINE

This is a divisional application of parent application Ser. No. 692,104, filed Dec. 20, 1967, now U.S. Pat. No. 3,586,570 and entitled LABELING MACHINE.

BACKGROUND OF THE INVENTION

This invention relates to labeling machines, and more particularly to a roll feed labeling machine for applying individual labels severed from a roll of such to individual articles such as containers.

In recent years, greater use has been made of labeling machines capable of severing individual labels from a roll of like labels, and applying them to articles, frequently containers. In normal practice, the like labels are joined continuously in a band for rapid, non-stop, dependable operation of the labeling machine. Any discontinuities in the repeat pattern of like labels are normally undesirable, their presence being conventionally detected by suitable sensing means which deactivates the machine to allow resetting by the operator. Although such discontinuities due to web splicing, faulty printing or the like are somewhat unavoidable, great efforts have been taken to avoid printing processes which by their nature cause repeat printing discontinuities as an inherent result of the printing process. Thus, the repeat label pattern of a web is normally printed by letter press, rotogravure, or flexographic press, or the like, to cause a continuous repeat pattern. Offset printing has been avoided because it produces a repeat scrap or blank space of different dimension than that of the labels, and at frequent intervals along the printed web or tape.

Yet, it has been determined that offset printing for labels for pharmaceutical containers or the like would be particularly advantageous because of the high quality of printing, because of the ability to couple an offset printer with the labeler to effect a complete interrelated printing and labeling set up, because offset printing plates are relatively inexpensive to produce, and because offset printing ink is readily available, among other reasons. However, as noted above, offset-printed tapes produce periodic non-print scrap areas caused by the zone of the printing cylinder where the peripheral printing plate ends are joined together, causing serious production problems in conventional labeling machines.

The labeling of pharmaceutical containers also involves the critical process of verification of the labels. That is, each individual label must be checked in a manner to insure that its application only to a container of one particular substance, or else disastrous results can occur. This verification process can be conducted by using a particular identifying code on each label. Some systems of coding necessitate cut-out portions of the label tape, which are correlated with cooperative reading means, others use printed codes on the tape, and still others use both. The printed type is more desirable because it can be applied at the same time the other information is printed on the label, and requires no separate die-cutting process or the like. If offset printing could be used, however, the code indicia marks could be relatively small to be inconspicuous, and yet have high quality with very distinct boundaries and accuracy of location on the label.

Even with accurate code indicia printing, however, the present process of verification can yield improper results. As is known in the art, verification conventionally uses inspection or "reading" of the individual label code while the label is still on the tape so that the position of the web and each code symbol can be accurately held during inspection as by a photoelectric sensor. After being so-checked, the label is then fed to the cutter, severed from the tape, transferred to the applicator, activated as by heat to be adhesive, and applied to a container. Obviously, the label after being "cleared" by the verifying equipment, can become mishandled, doubled with another label, dropped, distorted, misapplied, or otherwise improperly treated in these subsequent steps so that, even though already cleared, is not properly applied to the appropriate container, to the great potential detriment of the ultimate user and the pharmaceutical company held responsible by law. Such mishaps also can prevent the pharmaceutical company representatives from being able at the end of an operational run, to properly account for the required correlation of number of labels with number of containers fed to the labeler, number of containers discharged from the labeler, and number of rejects.

These and other related problems are encountered with conventional labeling machines that require the continuous attention of an operator at the higher operating speeds.

SUMMARY OF THE INVENTION

One of the important objects of this invention is to provide a labeling machine capable of automatically accurately applying individual labels from an offset printed web that contains periodic non-print scrap portions along its length. The machine not only automatically controls the label feed to accommodate successive like labels, but also to accommodate the scrap portions, effectively remove the scrap portions from the web when encountered, even though at spaced intervals and of different length, and to transfer the scrap portions out of the machine to prevent interference with label advancement and application.

Another object of this invention is to provide a web feed labeling machine able to automatically controllably advance a label tape having discontinuities along its length, such advancement being an amount equal to the exact length of the labels when these are encountered, and being an amount equal to the exact length of the discontinuity when these are encountered, whether the latter be the same length as or a different length than the length of the labels.

Another object of this invention is to provide a labeling system having completely reliable verification of individual labels on individual containers by being capable of repeatedly, rapidly, and dependably verifying the labels after each is applied to an article such as a container. In the machine, the container acts as a carrier of the label and is held, while advanced, in an exact relationship from the label applicator station to the subsequent verification station. Unique container gripping and retention apparatus holds the container, as it is advanced between these stations, in a manner that the applied label retains exact registry to enable the verification apparatus to verify the label, and also to determine accuracy of label positioning on the container, even though the individual containers or other articles vary somewhat in length. The label verification means in the combination is thus able to perform this dual function of checking correlation of the label with the container and checking the label position in a rapid, dependable, mechanized manner.

Another object of this invention is to provide a special container gripping and advancing means first allowing label application at one station and subsequent label verification and label position determination at a subsequent station. Another object of this invention is to provide positive container discharge control of each such gripping means, requiring verification clearance and correct label position clearance for each labeled container before discharge to the "acceptable" product output is allowed. The container gripping and advancing means passes through successive stations of container receiving and gripping, label application, label verification, and then either non-acceptable container discharge, or acceptable labeled-container discharge. It enables exact correlation between number of labels fed in, containers fed in, acceptable labeled containers discharged, and non-acceptable containers discharged. The gripping means retains each container securely, yet grips each gently so as not to disrupt any fragile caps on the containers.

Another object of this invention is to provide a labeling machine having a special two-stage label web feed and cut-off sequence cycle wherein the first feed stage is activated each time an individual label of a repeat pattern is to be advanced to the cutter, the second feed stage is activated only with the presence of web portions other than the repeat label pattern portions, e.g. such as scrap portions, and the cutter is controllably activated in both stages so as to cut-off the individual labels in the first stage and to cut-off any other web portions such as scrap in the second stage of the cycle. Moreover, the machine has a scrap pick off and removal means adjacent the cutter, and activated only during the second stage to receive any cut-off scrap portion or the like and remove it from the flow path of cut labels.

Another object is to provide such a two-stage cycle labeling machine wherein the article to be labeled is controllably advanced only once per cycle and in a manner that a proper label fed and severed during the first stage will be applied to an article, but a scrap portion fed and severed during the second stage will not be applied to an article.

Another object of this invention is to provide a system of applying simplified printed indicia code markings on a label tape and specially detecting the nature of such to enable simultaneous checking of label verification, and longitudinal, lateral, and askew label position accuracy.

Another object of this invention is to provide a label web control method comprising offset printing labels on a web with data including code indicia, with inherent periodic non-print segments or portions on the tape, advancing the label tape with two stage feed cycles wherein the individual labels are advanced to a cutter in the first stage and the non-print web portions are advanced to the cutter in the second stage, and cutting the web in a two stage cutting cycle wherein the individual labels are cut-off the tape during the first stage and the non-print portions are cut-off during the second stage. The tape is advanced for both the labels and the non-print portions in exact controlled amounts in response to sensing of special indicia markings. The severed non-print portions are removed. The severed labels are applied to containers, and subsequently checked for verification and position accuracy on the containers.

The novel labeling machine has, among other features, basic features of capacity for automatically feeding of offset printed label tapes and cutting off individual printed labels and periodic scrap segments from the repeat label pattern tape, according to a special two-stage cycle, applying the severed labels to specially gripped and advanced articles such as containers, advancing the applied labels in exact registry while so gripped by using each container as a label carrier, to label verifying and label position checking means, and controllably discharging the labeled articles to unacceptable output means or acceptable output means.

These objects and features and other objects and features will become apparent from the detailed description to follow.

DESCRIPTION OF THE PREFERRED EMBODIMENT

Figure 1:
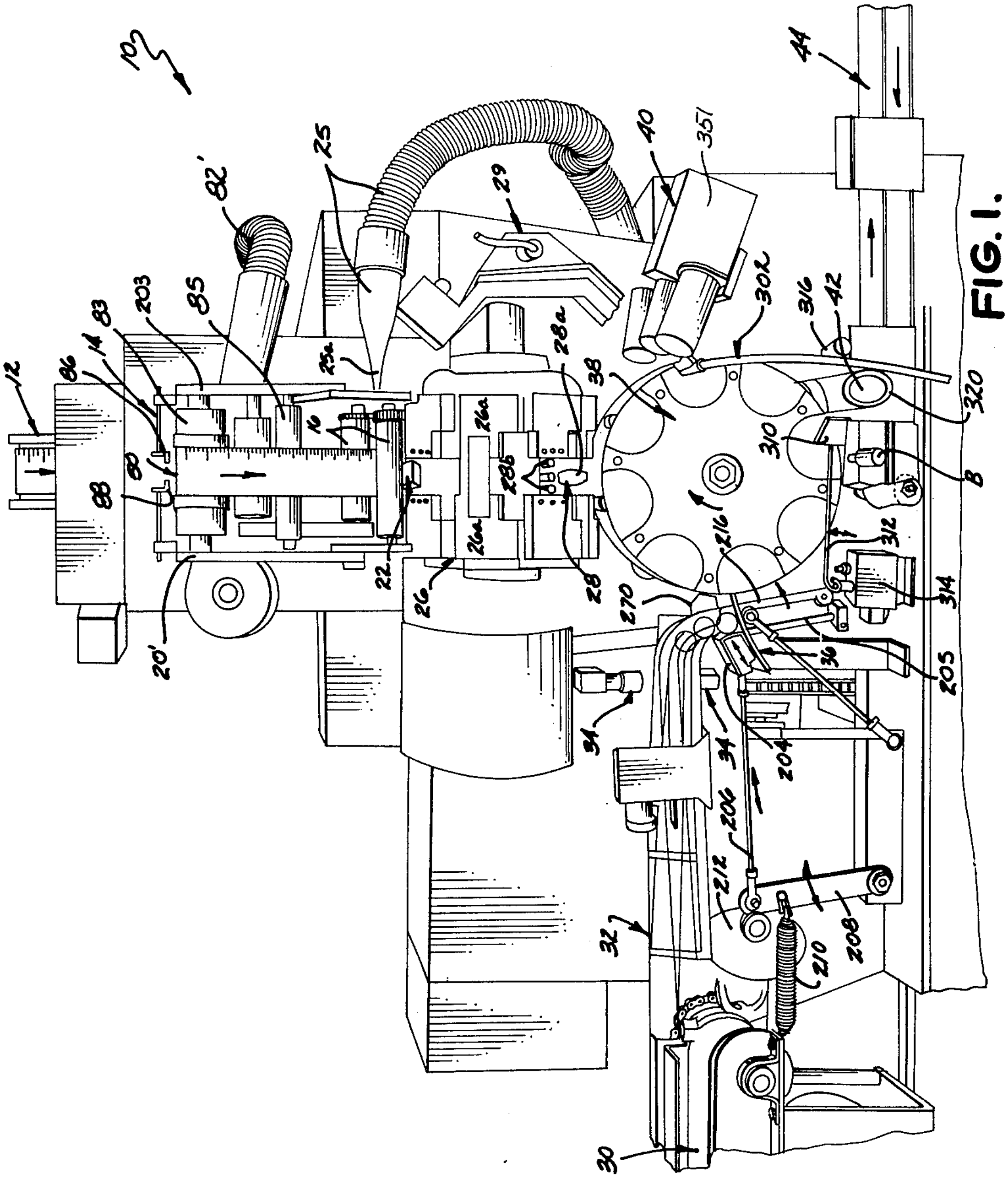
FIG. 1 is a front perspective view of the novel labeling machine.
Figure 3:
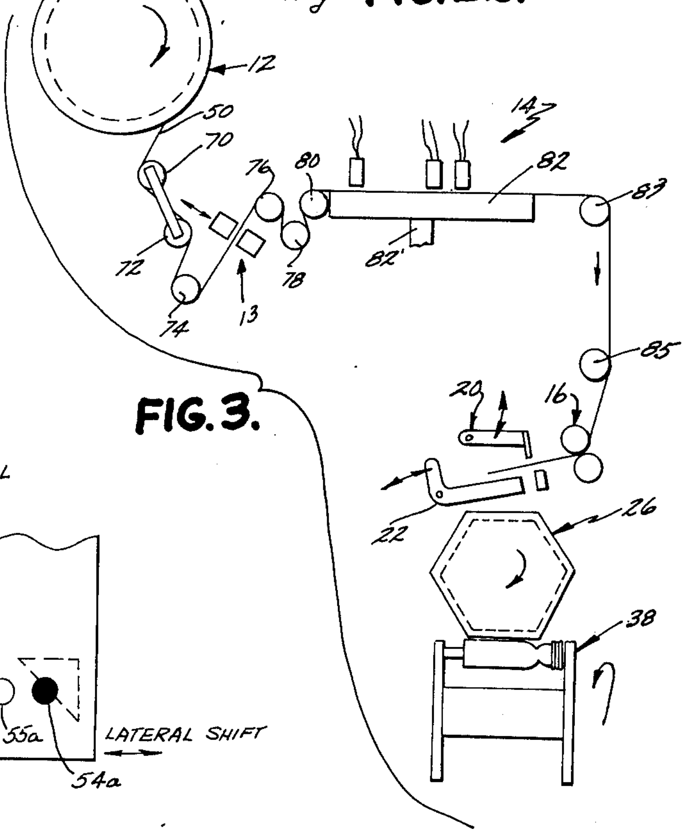
FIG. 3 is a diagrammatic view of the system, showing particularly the label tape feed path.
Figure 4:
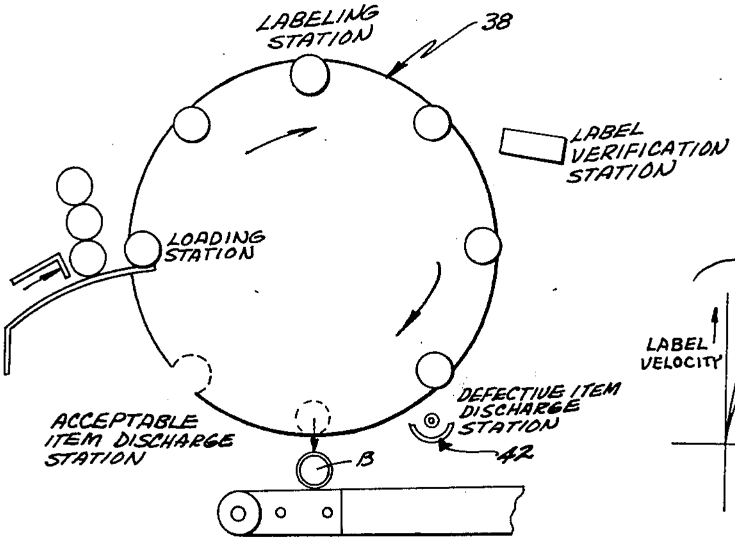
FIG. 4 is a diagrammatic view of the article handling apparatus, showing particularly the successive stations through which the article is transferred.
Figure 9:
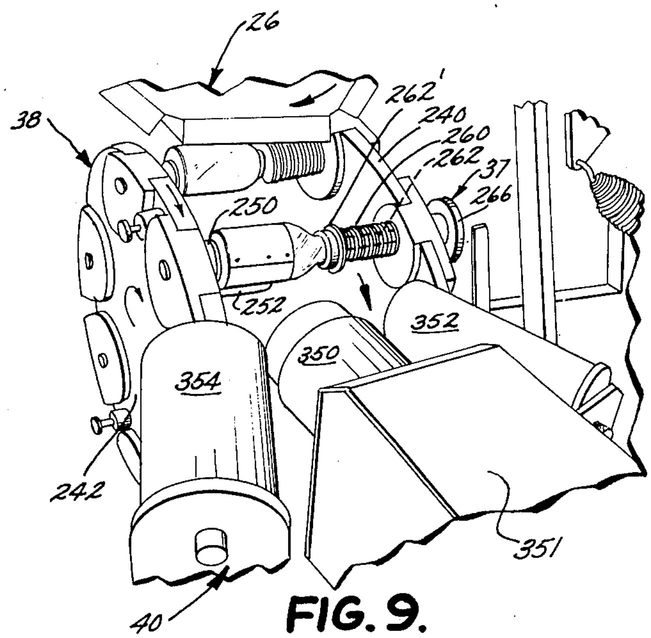
FIG. 9 is a fragmentary perspective view of the article or container gripping and advancing mechanism and the label verification means.
Figure 10:
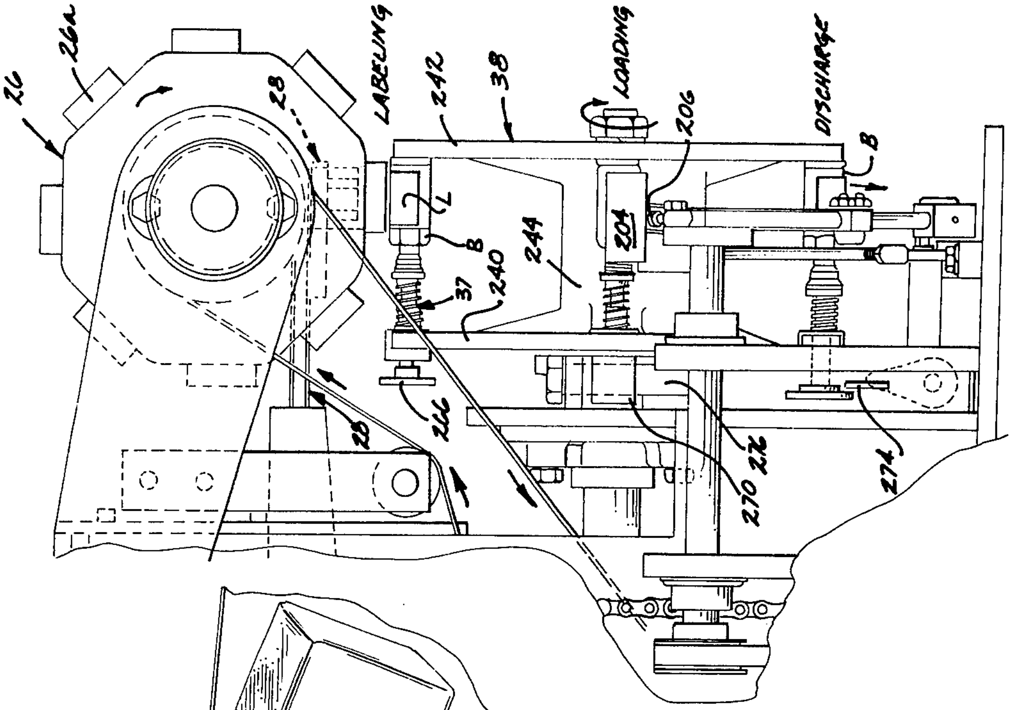
FIG. 10 is a fragmentary end elevational view of the labeling machine shown from the left end as the structure is positioned in FIG. 1.
Figure 12:
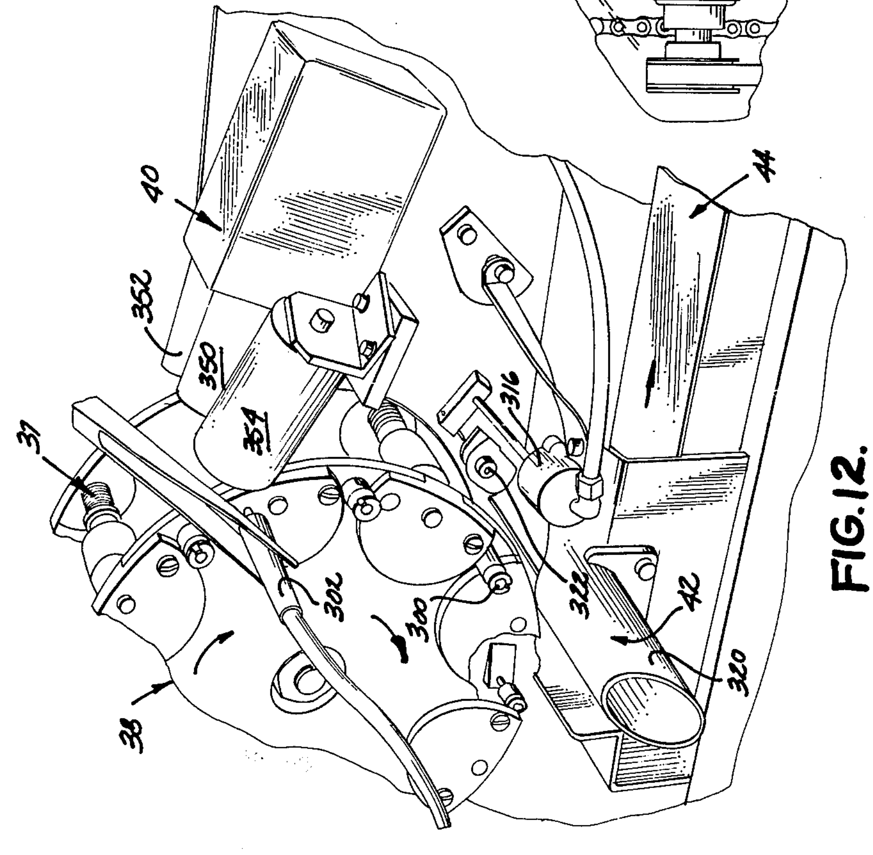
FIG. 12 is a fragmentary perspective view of the container gripping and advancing means, the label verification means, and the labeled container discharge means for defective containers and satisfactory containers.

Referring now particularly to the drawings, labeling machine assembly 10 is composed of several subassemblies, including label tape support reel subassembly 12, imprinter subassembly 13, label tape sensing and feed control subassembly 14, label tape advancing feed rolls 16 and drive subassembly 18 therefor (FIGS. 3, 20 and 21), label tape cut-off means 20 (FIGS. 3 and 21–23), individual label transfer means 22 from the cut-off to the label advancer, (FIGS. 3, 21, 22, 24), label scrap removal means 24 (FIGS. 16 and 21), label activating and advancing wheel means 26, and label applicator subassembly 28 (FIGS. 1 and 10). The containers to be labeled are in turn controllably advanced to the label applicator subassembly 28 by means of the following subassemblies. Specifically, container advancing conveyor 30 pushes the containers in file into and through a container re-orienting or tilting guide subassembly 32 past a container sensing or detecting subassembly 34 to individual container loading subassembly 36. It advances the individual containers one at a time between the gripping portions of gripping subassemblies 37 on a revolving container retaining and advancing wheel subassembly 38. This advances the containers from the loading station (FIG. 4) to the labeling station and label applicator subassembly 28 (FIGS. 1 and 4), and then through the label verification station (FIG. 4) where the label code and position are checked by the verifying and position checking subassembly 40 (FIGS. 1, 2, 9, 11 and 12). The labeled articles e.g., containers are then conducted to a defective item discharge station (FIG. 4). The defective articles are discharged from apparatus 38 and 37 by the defective item discharge subassembly 42 (FIGS. 1, 4 and 12) while the acceptable items are discharged onto the acceptable item conveyor means 44 (FIGS. 1, 4 and 12).

It will be understood that since this machine is capable of providing the extreme accuracy and dependability required for labeling pharmaceutical containers such as bottles, it will be described largely with respect thereto for convenience. However, it will be readily appreciated by those in the art that this machine can be adapted to other types of containers, or other types of articles.

Figure 15:
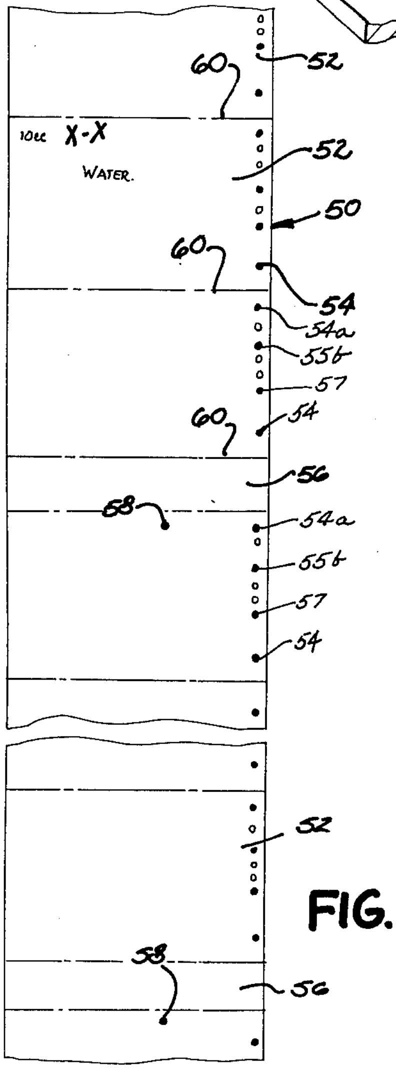
FIG. 15 is a plan view of an example offset printed label tape.

An exemplary form of an offset printed label tape that can be accommodated in this system is illustrated at FIG. 15. This label tape 50 includes a plurality of adjacent joined like printed labels 52 having any suitable information printed thereon, illustrated for example by the sample lettering "10CC X-X water". Such labels typically include the identification of the contents, the expiration data of the product, and the name of the manufacturer such as a pharmaceutical company. Since this type of label tape is printed by offset printing, the quality of the printed material is particularly high, including the code system dots 54 applied to each individual label as it is printed. Also, since the tape is offset printed, non-print scrap portions 56 will occur periodically along its length, at equal intervals, because of the junction of the printing plate around the periphery of the printing cylinder. According to the novel system of control, a special code dot 58 is printed adjacent each of these scrap sections to enable sensing control of the label tape feed in a manner to be described specifically hereinafter. Also, the individual labels are shown separated by phantom printed lines 60 to illustrate the relationship of the individual label portions and with the non-print scrap section or portion 56, each shown straddled by a pair of these lines. Scrap sections 56 will almost invariably be of a different length along the longitudinal extent of the tape than the length of the individual labels. The novel machine is capable of handling labels of varying length and width without significant adjustment of the mechanism. Also, the particular arrangement and number of code dots will vary for each particular identifying label, with each code system being correlated directly with the contents identification printed on the label. The verification apparatus 40 is programmed to distinguish between the label codes in a manner to be explained in detail hereinafter.

Figure 2:
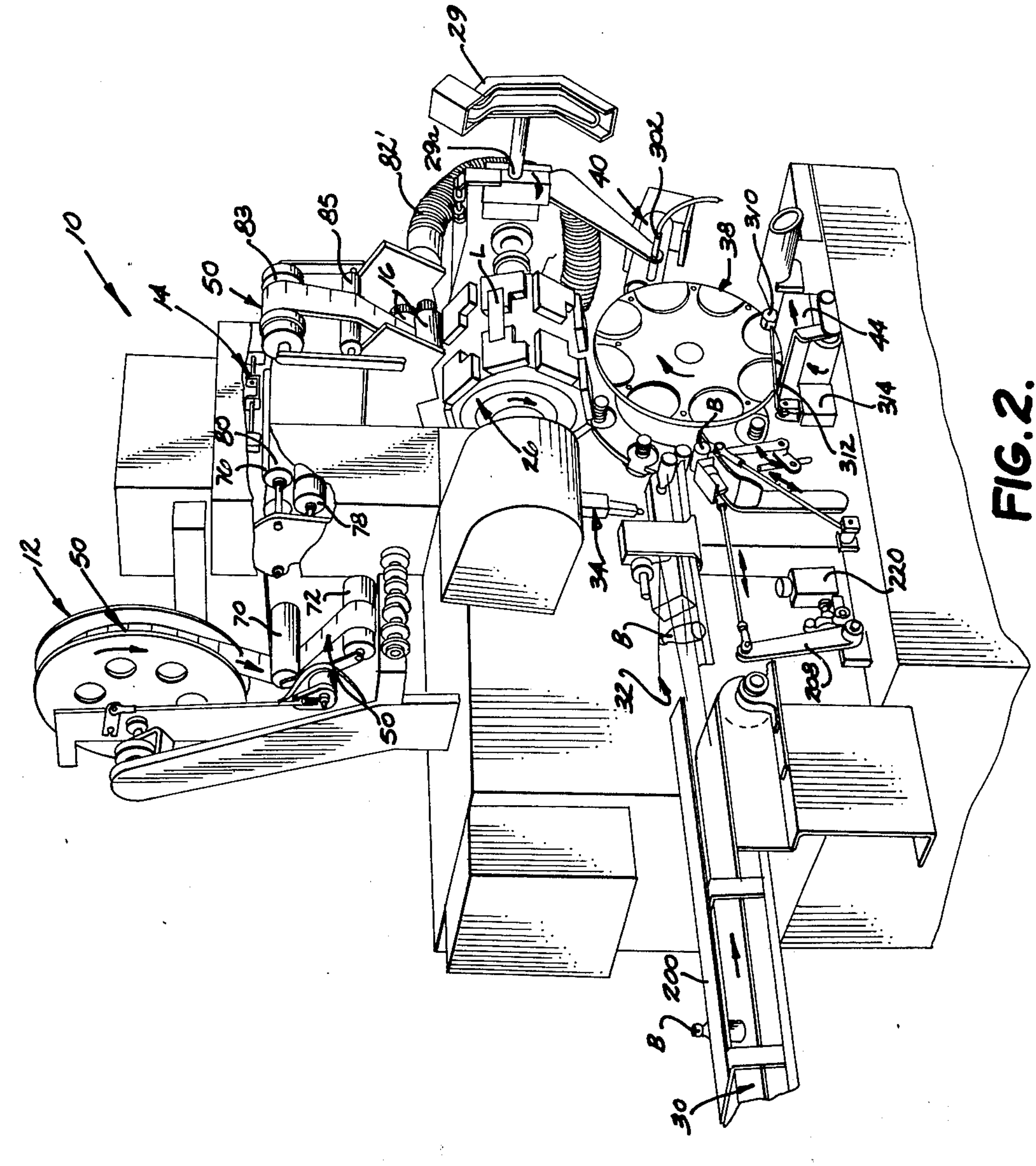
FIG. 2 is another perspective view of the labeling machine in FIG. 1, taken from an angle to the left of the front of the machine.
Figure 14:
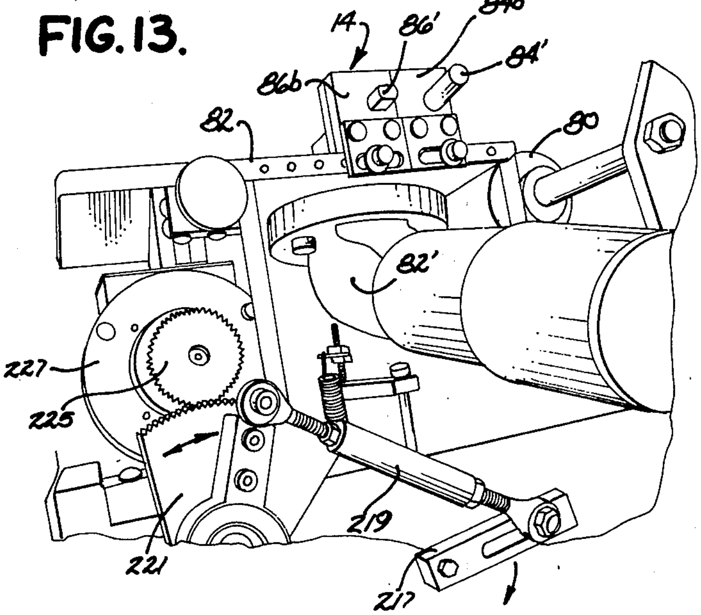
FIG. 14 is a fragmentary perspective view of the underside of the vacuum platform in FIG. 11 and a major portion of the label feed drive mechanism.

This offset printed tape is normally wound on a suitable magazine reel 12 which is rotatably mounted on the machine as illustrated in FIG. 2. Alternatively, the tape can be fed into the machine directly from an offset printer. The tape is actually pulled intermittently into the machine by a pair of tape-straddling and engaging feed rolls 16 (FIG. 3) while the tape is held under tension and is guided in its particular advancing path by a series of rollers. More specifically, tape 50 is shown in this particular embodiment to be advanced from reel 12 around a pair of biased slack take-up rolls 70 and 72 (FIGS. 2 and 3), around direction changing roll 74, around a trio of rolls 76, 78 and 80, from whence it passes over a special, flat, hold-down platform 82 past the sensing subassembly 14. This platform 82 is a suction platform, having internal passages connected with exposed ports on its upper surface and communicative with a vacuum outlet 82' attached to its underside, (FIGS. 1, 3, and 14). It draws a partial vacuum on the underside of the tape to hold it flattened for scanning by the sensors, but without significantly restraining the tape from advancing. Arranged immediately above this platform are the three independently adjustable sensors 84, 86 and 88.

Figure 13:
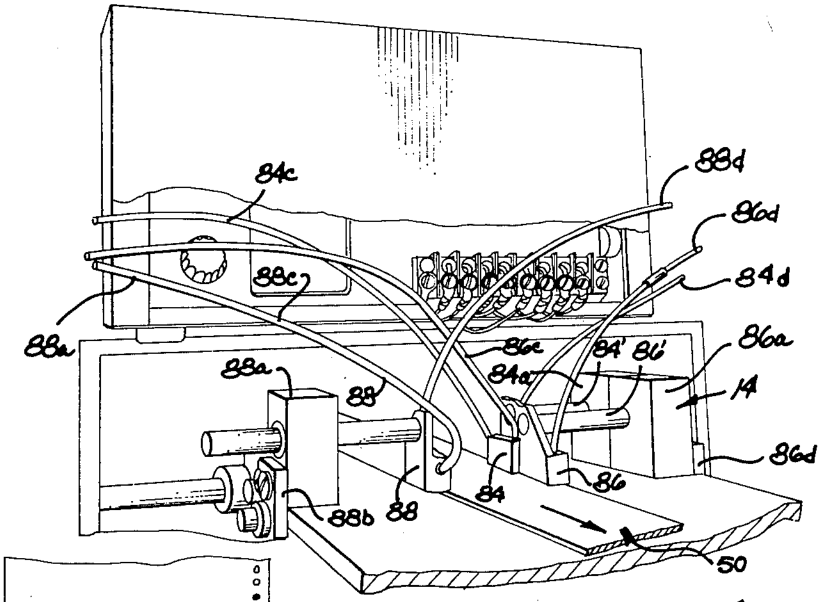
FIG. 13 is a fragmentary perspective view of the sensing elements of the label web advancing system in combination with the label web or tape hold down platform.

Each of these sensors is mounted on a support bar 84', 86' and 88' respectively, which are transversely adjustable with respect to the tape and their mounting blocks **84*a*, 86*a*, and 88*a* respectively (FIG. 13). These mounting blocks are in turn longitudinally adjustable in the direction of advance of tape 50 on additional mounting elements 84*b*, 86*b*, and 88*b* (FIGS. 13 and 14**). This transverse adjustability enables the accommodation of label width, i.e. across the tape, while the longitudinal adjustability enables accommodation of label length, i.e. along the longitudinal direction of the tape.

Each of these sensors 84, 86, and 88 includes light supply means, preferably in the form of fiber optic bundles 84c, 86c, and 88c respectively, oriented to shine light upon the label tape. Each also includes a photosensitive detector connected to electrical outputs 84d, 86d and 88d respectively (FIG. 13) and oriented for detecting the light reflected from the label tape to detect printed symbols on label tape 50 for control of the feed operation. Sensing unit 84 is slightly upstream of unit 86 relative to the direction of the label tape travel while sensor 88 is generally opposite sensor 86 (FIG. 13). These three sensors control the label tape feed operation to the cutter. Actually, they control the tape one or more print cycles ahead of the label at the cutter. More specifically, since the offset printed label tape has a repeat print cycle of several inches in length, e.g. usually between 14 and 18 inches in length, a scrap section 56 will occur at this interval. This particular interval is exactly this same predetermined distance along the length of the label tape each time because of the fixed distance on the circumferential offset printing head. Therefore, the labeling machine can be set up to cause the cutter to operate on the label in one print cycle while the sensing units 84, 86, and 88 are exposed to the like positioned label exactly one offset printing cycle back on the tape. If the printing cycle is such that the scrap section 56 occurs every 16 inches, for example, and if the cutter is operating on the first label behind a scrap section, the sensing units will be controlling the operation of the cutter and the label feed by sensing the like label 16 inches upstream on the label tape and immediately adjacent the correspondingly spaced scrap section. Of the sensors 84, 86 and 88, sensor 86 is the prime cut off sensor which detects the first indicia dot 54 toward the leading edge of a label to stop the label strip feed for cutting of the end label. Sensor 88 detects the periodic presence of scrap-indicating dot 58 which precedes each scrap section 56. If it detects a dot 58, it initiates the label strip feed during the second part of the cycle to cause scrap feed and cut-off. Sensor 84 is the auxiliary sensor that stops the scrap feed (started by sensor 88) at the end of the scrap section, for cut-off. These cooperate with incoming article sensor 34. Actually, the sensors 86 and 84 are programmed on a timed basis to be operative only when the dots on the labels are about to pass under the respective sensor, so that they will not be triggered by other marks on the label tape.

More specifically, the photoelectric sensing units, when detecting the particular indicia for which they "look" or "scan", emit electrical signals which control the clutch brake unit 227 as noted previously. The control system is activated initially when bottle sensor 34 detects the presence of the incoming bottle to be labeled. This enables unit 227 to be energized as a clutch and de-energized as a brake. Sensor 88 is then energized to be operable to scan for the possible presence of a waste mark 58. If no waste mark is noted, sensor 88 becomes inactive again. When sensor 86 detects its mark 54, it stops the feed and also signals a memory-time delay unit to reactivate the label feed after it has stopped long enough to enable cut-off of the label (actually the corresponding label one print cycle downstream on the tape as explained earlier). With activation of sensor 86, this actuates unit 227 as a brake and de-actuates it as a clutch, so that the cutter accurately cuts off the corresponding label one printing cycle down the tape. Then the clutch is re-activated during the first stage of the next cycle to feed another label, in response to the time-delayed memory signal. Sensor 88 then is again operable to scan for a waste mark 58. If it detects one, it electrically signals a time-delay memory unit to cause clutch-brake unit 227 to be re-activated as a clutch during the second stage of the cycle. It also activates, during the second stage of the cycle, sensor 84 to scan for the tail end of the scrap. The clutch thus feeds the scrap segment until sensor 84 de-energizes the clutch and energizes the brake until the first stage of the next cycle. The scrap is cut-off by the second cutter stroke of the cycle, and evacuated out of the machine by unit 24. The machine is then ready for the first stage of the next cycle.

Each time the label tape feed is started and stopped, and cutter 20 (FIG. 3) is activated to sever the terminal label, the label is picked up by the vertically pivotally shifting transfer arm means 22 (to be described more fully hereinafter) which transfers the label down to a pair of suction plates 26a on the periphery of the label activator and advancing wheel 26. This individual label feed occurs only during the first stage of the two-stage feed cycle. This two-stage cycle is provided to enable scrap sections 56 to be cut-off the label tape during the second stage of the cycle. In other words, the cutter 20 reciprocates twice for the advancement of each individual label, the first reciprocating action serving to cut-off the individual label advanced, and the second reciprocating action serving to cut-off a scrap section if such a scrap section should be controllably fed forward during this second stage of the cycle. When a scrap section is fed forward, and cut from the label tape at the end of the second stage, it is not applied to a bottle because the bottle advancing wheel 38 only shifts once for each complete two-stage cycle of the label feed system, and then with a timing to have a bottle correctly in label receiving position as a label is transferred to it. The label advancing means 26 also is timed in its advancement to have a pair of heater plates adjacent the label transfer arm only once during each cycle and then with a timing to pick up only a label severed during the first part of the cycle. Wheel means 26 is timed with wheel means 38. Still the severed scrap sections should be removed and not allowed to fall freely within the machine to cause operational difficulties arising from these scrap sections in the equipment.

This scrap removal is accomplished by scrap removal subassembly 24 (FIG. 16) which is reciprocated once during each cycle, and then only during the second stage of the cycle into a position having its receiving mouth immediately adjacent the cutting blade. Therefore, any scrap section cut-off during this second stage is sucked into this flattened tube and out through outlet vacuum hose 25 (FIG. 1) which has a nozzle 25a (FIG. 1) flattened to correspond with and fit the end outlet 24e (FIG. 21) of unit 24. This scrap pick off and removing vacuum unit 24 is pivotally mounted on a horizontal pivot shaft 100 (FIG. 21) and has an upwardly protruding mounting portion 24a that supports a cam follower 24b which in turn engages a cam 102 (FIG. 20) that is supported on, but rotatable with respect to shaft 104 as by being mounted on a bushing around shaft 104. This vacuum scrap pick off unit 24 vertically reciprocates once each complete machine cycle so that its mouth is adjacent cutter blades 20a and 20b of cutter unit 20 during each second stage or half cycle when any scrap is cut-off. It is not keyed to shaft 104 because shaft 104 rotates twice for each complete cycle.

Figure 23:
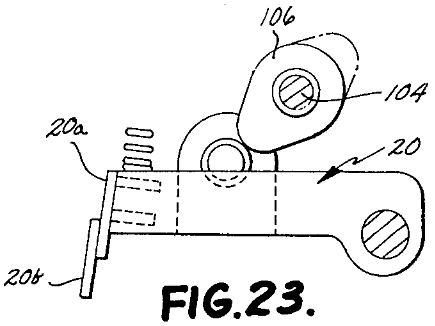
FIG. 23 is a side elevational view of the cut-off means and its operating cam.
Figure 22:
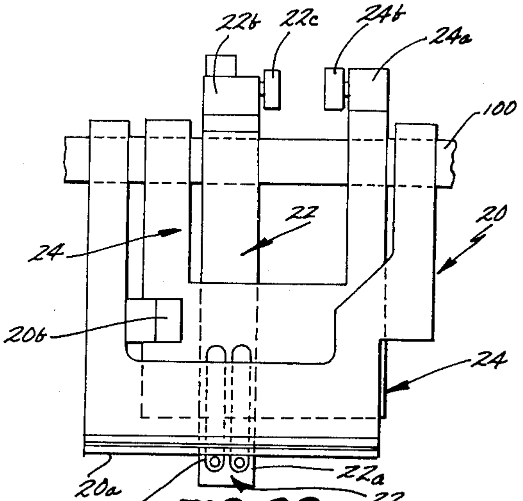
FIG. 22 is a plan view of the assembled cut-off means, label transfer means, and scrap removal means.
Figure 24:
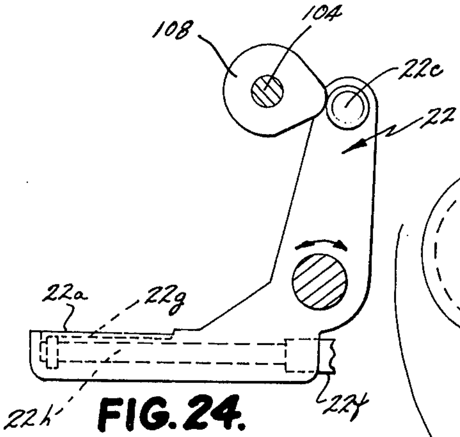
FIG. 24 is a side elevational view of the label transfer arm.
Figure 21:
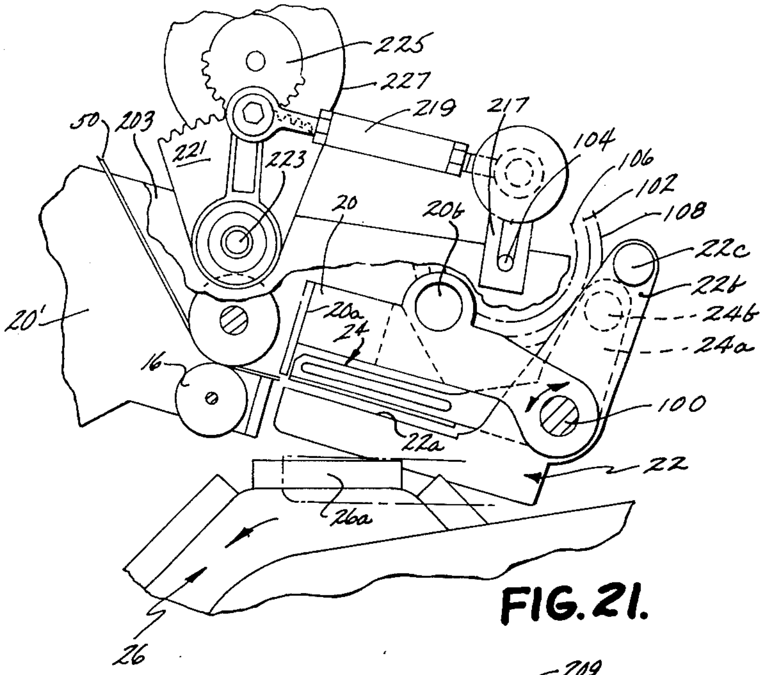
FIG. 21 is a side elevational view of the label tape feed, cutter, transfer, and advancing mechanism, and of the scrap removal means.

The upper blade 20*a* of cutter unit 20 is also affixed to a U-shaped mount 20*c* which is pivotally supported on shaft 100. The mount includes a cam follower 20*b* that engages a cam 106 on camshaft 104 (FIGS. 21 and 23).

Also pivotally mounted at its center to shaft 100 is label transfer vacuum arm 22. It has a label pick off surface 22*a* which is positioned adjacent the cutter when transfer unit 22 is in its elevated position. Suction is applied through this arm to retain and transfer a label down to one of the plurality of heated pairs of label transfer plates 26*a* of wheel 26. Arm 22 engages the label between its ends, and plates 26*a* engage the label at its ends, in the structure here shown. Transfer unit 22 is reciprocated vertically between the label receiving position adjacent the cutter and the label transfer position adjacent unit 26 by having an upwardly protruding rear portion 22*b* that mounts a cam follower 22*c* engaging cam 108 that is also on a bushing on cam shaft 104 so as to be rotatable with respect to to shaft 104. Cam 108 causes transfer unit 22 to be reciprocated vertically once during each complete cycle and specifically during the first stage of the cycle, to pick up a label that is severed from the label web 50. The transfer arm subassembly 22 is basically an elongated generally L-shaped or dog leg member mounted intermediate its ends on the pivot shaft. The lower generally horizontally extending leg member includes the upper flat label retention surface area 22*a* which has a plurality of evacuation depressions 22*g* communicating through suitable passages 22*h* and a vacuum hose connection 22*g* to evacuation means (not shown) for holding a cut label to its surface for a predetermined time. The negative pressure is applied to this surface when the arm is in its upper position adjacent the cutter to pick up and retain a severed label, and is released in the lowered position of the arm between a pair of label retainer and heater plates 26*a* where the label is transferred.

Figure 16:
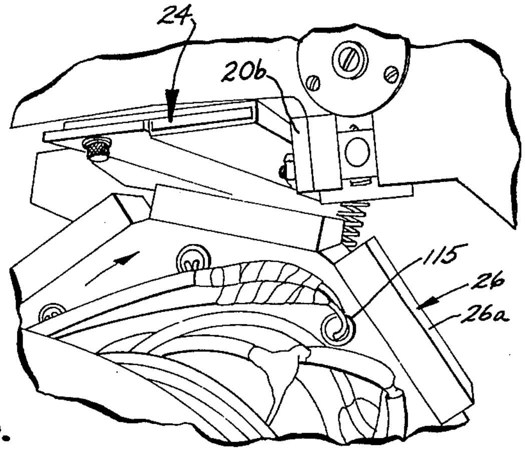
FIG. 16 is a fragmentary enlarged perspective view of the upper part of the severed label advancing wheel, and one end of the label tape scrap removal means.

These pairs of arm straddling heater plates are mounted on the periphery of the rotational, intermittently advanced label advancing and activating drum subassembly 26. These spaced pairs of flat plates 26*a* retain and heat the edges of severed labels (FIG. 1) as they are intermittently advanced through successive positions around the drum from the label pick up 12 o'clock position to the label discharge 6 o'clock position. These plates can be removed and substituted by other plates to accommodate any particular type of label as desired. They are normally electrically heated through internal resistance elements 115 (FIG. 16). Additional heat can be applied by a supplemental heater unit 29 (FIGS. 1 and 2) which can be pivotally swung on hinge 29*a* adjacent wheel 26 or swung away as shown in the drawings. Along the inner edge portions of the plates is a plurality of surface vacuum ports 26*b* (FIG. 1) communicating through internal passages with evacuation means (not shown) for retaining the label between the pick up 12 o'clock position and the discharge 6 o'clock position. Suitable valving means apply the vacuum at the 12 o'clock position and release it at the 6 o'clock position. When the label is released, the label applicator subassembly 28 of conventional type presses the label down upon a bottle with a lowering pressure pad or fingers 28*a* (FIG. 1) while straddling wiper elements 28*b* lower to wipe the label around the bottle.

Figure 20:
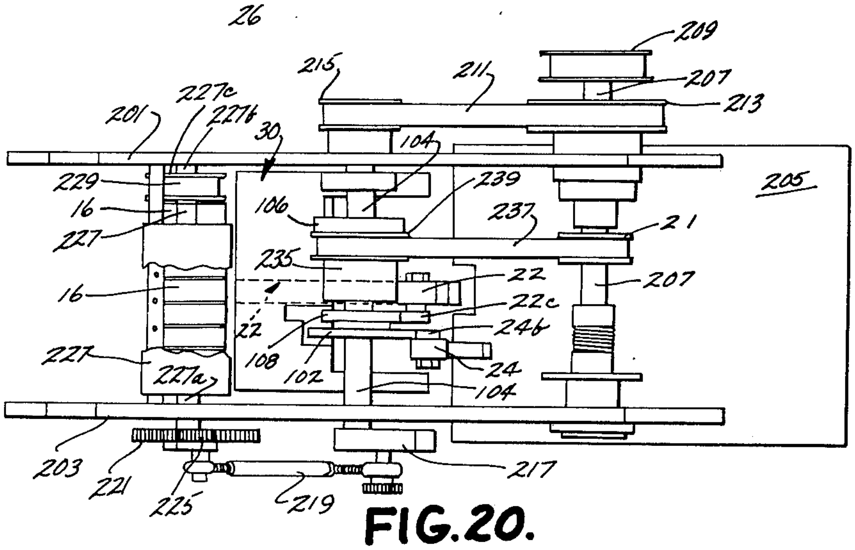
FIG. 20 is a plan view of the major components of the label tape feed drive assembly.

These moving components of the assembly are all advanced in controlled timed relationship. The cutter, transfer arm, and scrap remover are controlled by cams 106, 102, and 108 for the cutter, scrap remover, and transfer arm respectively. These are supported by a shaft 104 which is rotationally mounted between a pair of spaced vertical support plates 201 and 203 attached to a base 205 (FIG. 20) at the top of the machine. These plates also rotationally mount feed rolls 16, and shaft 100 therebetween. The power input to these components is through pulley 209 to power shaft 207 (FIG. 20). A two-to-one drive take-off connection is provided from shaft 207 to shaft 104 through a timing belt 211 between pulleys 213 and 215 keyed to these shafts. Secured to the opposite end of shaft 104 from pulley 215 is a crank 217. A pitman 219 is attached eccentrically to crank 217 on one end and is eccentrically attached on its opposite end to a gear sector 221 pivotally mounted on stub shaft 223. This pitman 219 can be adjustably positioned along crank 217 to drive different amounts per crank revolution to accommodate different label lengths on different runs of the machine. Meshed with gear sector 221 is spur gear 225 on the input end of a combination solenoid clutch-brake unit 227 of conventional type. On the output shaft 227' of unit 227 is a timing belt and pulley connection 229 to the upper feed roll 16 immediately below it. This upper feed roll has gear teeth on one end meshed with gear teeth on the lower feed roll (FIG. 1) to drive it. When unit 227 is electrically actuated as a clutch, the input through its input shaft 227*a* (FIG. 20) is transferred through it to its output shaft 227*b* to drive pulley 227*c* and belt 229 to the feed rolls 16. When it is actuated as a brake, it applies braking force to its output shaft to hold the feed rolls in locked position and does not transmit its input force. It is controllably actuated as a clutch during movement of gear sector 221 in the forward direction, and as a brake during movement of gear sector in the reverse direction. The two-to-one drive connection of shaft 207 to shaft 104 enables two feeding state movements of the feed rolls for each cycle of shaft 207. Actually, the brake-clutch unit 227 does not drive the feed rolls during the entire first stage and entire second stage. Rather, the feed rolls are driven only during the portion of the first stage that unit 227 is electrically activated as a clutch under the control of sensors 86 and 84 according to label length, and the feed rolls are driven during the second stage only when unit 227 is electrically activated as a clutch by sensor 88 sensing a scrap portion and only then until stopped by sensor 84 sensing the end of the scrap portion. During the time that this label tape feed mechanism is cycled through its two stages, the cutter 20 is also actuated and vertically shifted twice, once at the end of each feed stage, while the transfer arm 22 and the scrap remover 24 are actuated and vertically shifted once, with transfer arm being shifted during the first stage and the scrap remover being shifted during the second stage of the cycle. This is achieved by having the cutter cam 106 rotate twice each cycle, and having the transfer arm cam 108 and the scrap remover cam 102 rotate once each cycle. This is done by keying cam 106 directly to shaft 104, and by securing cams 107 and 108 to a bushing 235, all of which elements 102, 108, and 235 float freely (rotationally) on shaft 104. This bushing and these cams 102 and 108 are driven on a one-to-one drive connection from shaft 207 through a timing belt 237 and a pair of like pulleys 239 and 241 (FIG. 20). (Alternatively, cutter cam 102 could be provided with two noses as shown in phantom in FIG. 23 so it could be mounted to bushing 235 also). This one-to-one drive relation to the two-to-one drive of the feed provides the two-stage cycle.

Figure 5:
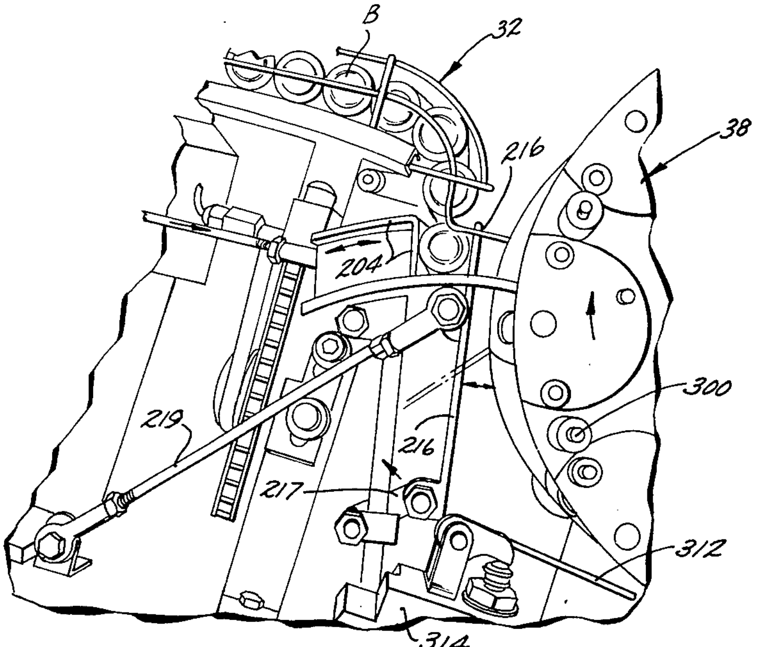
FIG. 5 is an enlarged fragmentary perspective view of the apparatus for loading individual articles or containers into the gripping and advancing means of the labeling machine.
Figure 6:
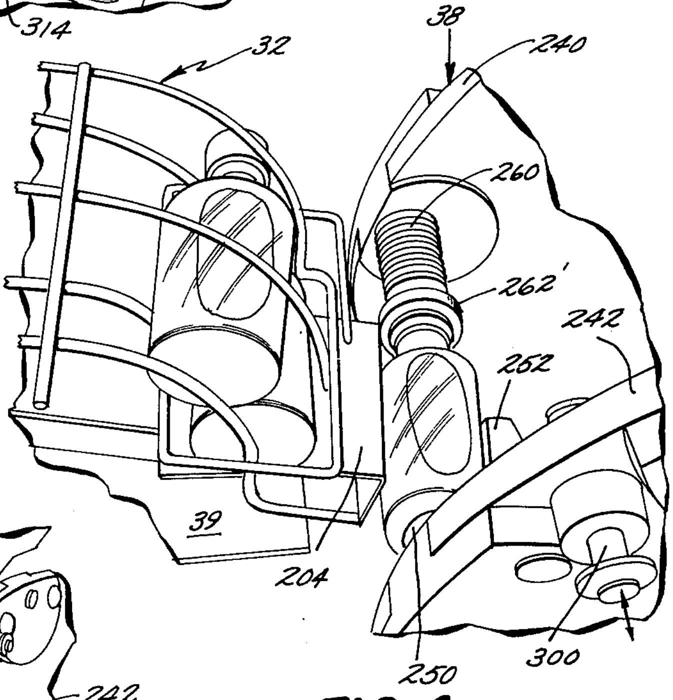
FIG. 6 is a further enlarged perspective view looking down upon a portion of the mechanism in FIG. 3.

The individual bottles to be labeled are specifically controlled and advanced in timed relation with advancement of the individual labels. Specifically, the containers or bottles B are advanced en masse along conveyor 30 being kept aligned along the edge of a suitable guide plate 200 or the like. At the end of conveyor 30 and guide plate 200, individual bottles are pushed into a rectangularly shaped wire guide 32 which re-orients the bottles from a vertical position to a horizontal position just prior to their entry into the rotating bottle gripping and advancing wheel means 38. As these bottles are pushed along in file form toward the wheel, photoelectric sensor 34 detects the presence of the bottles. The bottles are directed downwardly at the end of guide chute 32 where the lowermost bottle falls on an arcuate support plate 39 (FIGS. 1 and 6) that slants upwardly toward the bottle gripping means between the two plates of wheel 38. Each bottle is pushed into wheel means 38 (FIG. 6) by reciprocating advancing mechanism 36. More specifically, the lowermost bottle is pushed into the wheel unit 38 by the downwardly front depending leg of an L-shaped pushing member 204 while the upper generally horizontal leg slides under and retains the remaining upper bottles to prevent them from dropping down until the lowermost bottle is pushed into wheel 38 and the pusher 204 is retracted back to the position illustrated for example in FIG. 5. Pusher member 204 is advanced by a connecting rod 206 connected to the end of pivotal lever 208. Lever 208 is normally biased to a retracted position by spring 210 and periodically advanced by rotating cam 212. The bottles are prevented from being "squirted" out of guide 32 by the weight of bottles above them by a shiftable arresting member 216 in front of the lower bottle. Member 216 is pivotally mounted at its lower end to pivot link 217 (FIG. 5), and pivotally mounted near its upper end to rod 219 which is pivotally attached at its opposite end. This double linkage causes member 216 to lower as pusher 204 advances a bottle to a gripper, so that, when the bottle reaches the gripper, member 216 has been depressed below the bottle to be out of the way. With its return, it rises again in front of the next bottle.

Figure 7:
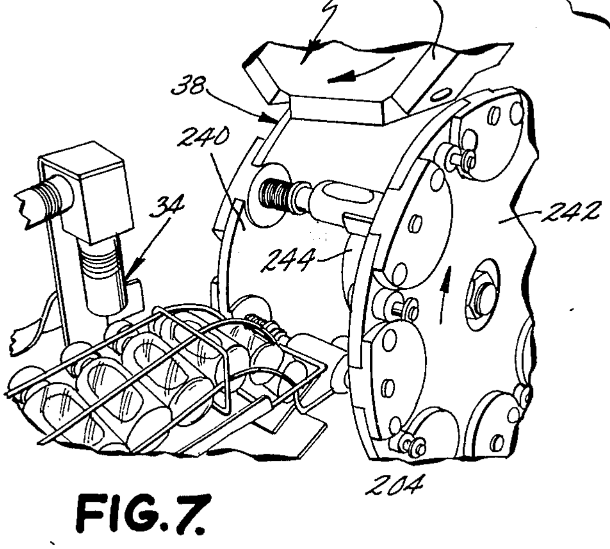
FIG. 7 is another perspective fragmentary view of the apparatus in FIGS. 5 and 6.
Figure 8A:
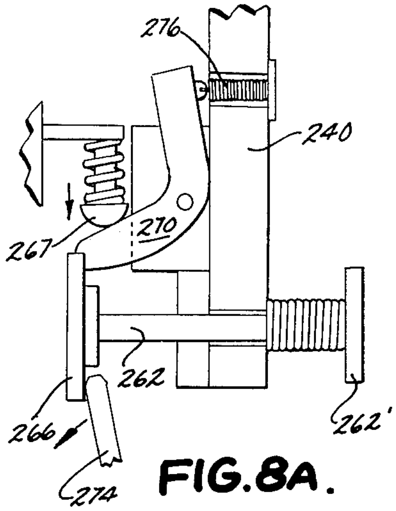
FIG. 8A is a sectional, enlarged view of the apparatus in FIG. 8.
Figure 11:
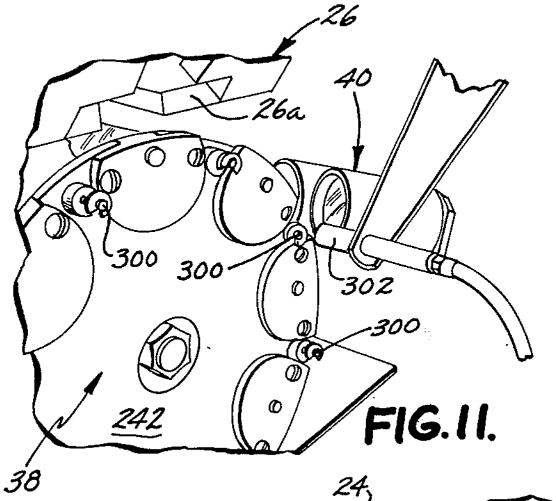
FIG. 11 is a fragmentary perspective view from the front of the apparatus in FIG. 9.
Figure 8:
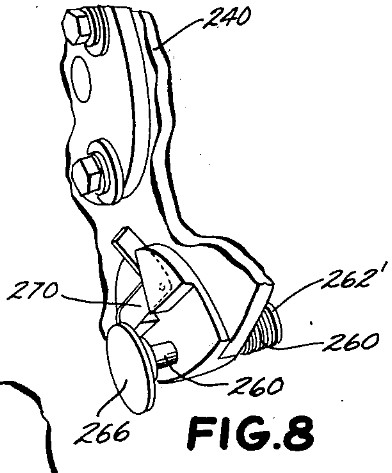
FIG. 8 is a fragmentary perspective view of a portion of the article gripping and advancing apparatus, showing one particular container-gripping mechanism.

The bottle retaining and advancing mechanism 38 has a pair of spaced rotational plates 240 and 242 mounted on a central hub 244 (FIGS. 6 and 7), and having around its outer peripheral portions a plurality of gripping mechanisms 37. Each such mechanism has cooperative parts on each plate. More specifically, around the periphery of plate 242 is a plurality of bottle retaining saddles for engaging one end portion of each bottle. Each includes an axial end abutment 250 (FIG. 6) and an adjacent arcuately curved saddle member 252. Mounted around plate 240 is a plurality of shiftable bottle engaging elements which comprise spring biased plungers with a coiled compression spring 260 surrounding the inner end portion of each plunger 262 (FIG. 9). On the inner end of the plunger is an enlarged bottle cap engaging flange 262'. This flange is biased by engaged spring 260 to press the bottle axially against stop 250 (FIG. 9). This mechanism fixes the bottle in exact axial, rotational, and radial position as the bottle is advanced around mechanism 38. Hence, when the individual bottles are gripped, then labels are applied to the individual bottles, and the bottles are advanced toward verifying means 40, the bottles in effect act as carriers for the labels and maintain the labels in specific position so that verification and label positioning can be accurately and rapidly achieved. Connected to the outer end of the plunger, i.e. on the outside face of plate 240 is a cap 266 which acts as a cam follower. It cooperates with cam members 270, and either cam 272 or cam 274 (FIG. 19) to cause the gripper to shift between gripping and releasing positions. The plunger mechanism can be latched in a cocked releasing position against the bias of spring 260 by a special latch fingers 270 mounted adjacent each of the plungers 262 and its cap 266 (FIG. 8 and 8A). Each L-shaped latch 270 has a notch in its outer end engaging the edge of cam follower cap 266. This latch is pivotally mounted at its center, and is biased into a gripper releasing condition by a small tension spring 276. The plunger 262 is released from its lateral cocked position to shift into a bottle gripping position under the force of spring 260 only by pulling it axially slightly further in the cocking direction, to allow tension spring 276 to retract latch 270 out from beneath cam follower cap 266. The plunger is cocked by being cammed against spring 260 with cam 272 or cam 274 (FIG. 19), and is latched by a latch-biasing member 267 (FIG. 8A), one of which is mounted adjacent cam 272 and one of which is mounted adjacent cam 274.

As noted, cam elements 270, 272, and 274, (FIG. 19) are positioned to cooperatively engage these cam follower caps 266 when the bottle gripping devices are to be released or engaged. More specifically, cam 270 is located immediately adjacent the loading station to allow the gripping mechanism to release from its cocked position to engage and retain a bottle, cam 272 is located immediately adjacent the "unsatisfactory item" discharge station to selectively cock and latch a gripping mechanism and thus release an unsatisfactory container into chute 320 at this station, and cam 274 is located adjacent the "satisfactory item" discharge station to selectively cock and latch a gripping mechanism and thus release an acceptable labeled container onto output conveyor 44.

Cam 270 is mounted on a pivot shaft 276 supported on its upper end in a bearing 278. It has a bevel gear 280 on its lower end engaging with a bevel gear 282 on the end of pivot shaft 284. On shaft 284 cam 274 is mounted to extend radially from it. Shaft 284 is oscillated by a crank 286 which has a cam follower 288 operated by driven cam 290. Cam 290 rotates in a manner to cause cams 270 and 274 to oscillate once for each one-eighth revolution of the particular bottle retaining wheel assembly 38 illustrated. I.e., these cams oscillate once for each gripping means advanced into their respective stations. Thus, cam 270 (FIG. 1) engages each cocked gripping means, and specifically cam follower cap 266 on plunger 262, to pull it outwardly slightly further against the bias, allowing latch 70 (FIG. 8A) to release under the bias of its retention spring 276. Cam 270 then slowly returns to allow plunger 262 and its bottle engaging member 262' to controllably axially engage the cap end of a bottle and foce it tightly into engagement with stop 250. Once a bottle is shifted radially into position between the gripping elements be feed member 204 (FIG. 1), the bottle is retained in this secured aligned position until intermittently advanced through its successive stations, to discharge. After the label is applied by subassembly 28, and the bottle is advanced to the next station, verifying means 40 checks the code dots 54 (FIG. 15) in a manner to be described in detail hereinafter, to determine whether the label bottle is satisfactory, i.e. that the label code properly corresponds to the programmed code set up in the verifying means, that the label is in the proper position laterally, longitudinally, and askew, with respect to the bottle. If the bottle is not acceptable, either because the label was not applied, or because the applied label is not properly oriented, or because the label code does not correspond, then it will be subsequently discharged at the unacceptable discharge station adjacent cam 272. If the bottle is acceptable, then it will be discharged at the acceptable station adjacent cam 274. This controlled discharge of acceptable and unacceptable containers or articles is shown using different discharge stations. Actually, the verification means may use varying ways of distinguishing between acceptable and unacceptable classes of items, including (a) a marking to be applied to one or the other classes, for subsequent separation by mechanical or manual means, (b) destruction of unacceptable items, or any of several other common methods of distinguishing between them.

Figure 19:
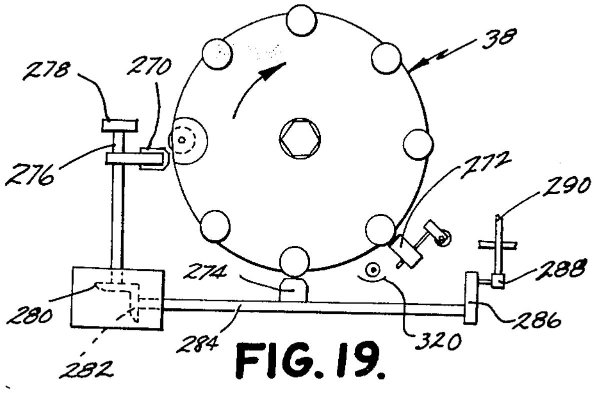
FIG. 19 is a diagrammatic view of the gripper control mechanism of the novel labeling machine.

In the form of the apparatus illustrated, the controller subassembly 40 determines which station the item is going to be discharged at, by the use of a plurality of axially shiftable pins 300 (FIG. 6) mounted on the periphery of circular element 242 of subassembly 38, one adjacent each bottle gripping means, and normally just circumferentially ahead of the correlated gripping means. The individual pin is correlated with the particular griping means just behind it so that it will be aligned with a pneumatic pin actuator 302 (FIG. 11) when the associated gripper unit and retained bottle are in the verifying station one sequential step from the labeling station. If the verifying subassembly 40 determines that the labeled bottle is acceptable, it electrically actuates an air valve (not shown) which pneumatically operates pin shifter 302 so that a spring biased piston is pneumatically advanced against protruding pin 300 to shove it back axially into a position where it will not subsequently engage a special trigger 310 (FIG. 1). This trigger is mounted on one end of a rod 312 which is pivotally mounted on its other end and which engages the actuator of pneumatic valve 314. Valve 314 controls the air supply to a small fluid cylinder 316 (FIGS. 1 and 12) which pivotally shifts cam 272 to release the bottle gripper of an unsatisfactory bottle as it reaches this discharge position. If the labeled bottle is approved by the verifying subassembly 40, its pin 300 will be shifted to not engage trigger 310. If trigger 310 is actuated, to cause shifting of cam 272 and release of the bottle at this station, the released bottle drops into the concave inner end of a tubular discharge chute 320 from which the article is ejected into a suitable receptacle (not shown) by an air blast from orifice 322 (FIGS. 12 and 19). This air blast is also activated by valve 314.

If the item is acceptable and the pneumatic pin pusher 302 shifts the pin in for the acceptable item, bumper 310 will not be contacted by the pin, but rather, as the item reaches the satisfactory item discharge station at the 6 o'clock position of unit 38, cam 274 cocks the bottle gripper mechanism to its release position, allowing the bottle to drop down on belt conveyor 44.

Alternatively, the defective articles can be released at the same station as the acceptable articles, and differentiated by having air nozzle or orifice 322 adjacent belt 44 to blast it into another container or the like.

Each depressed pin is returned to its forwardly protruding position by a suitable camming ramp 301 (FIG. 12) located between the discharge and loading stations.

Figure 25:
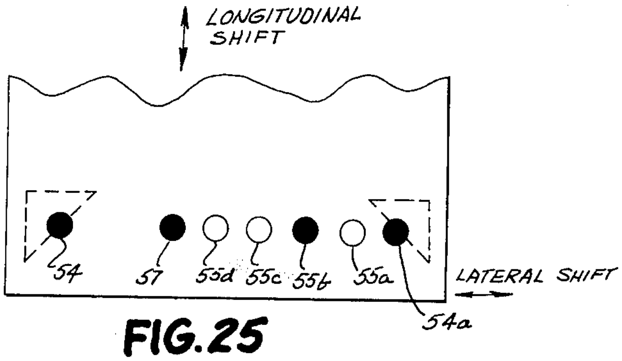
FIG. 25 is an enlarged fragmentary view of one end of a typical label with its indicia.

As noted previously, the label verification and orientation checking subassembly 40 is oriented toward the labeled bottle in first station past the labeling station. More specifically, this subassembly 40 includes a pair of light sources 352 and 354, and a photoelectric sensor means 350 between the straddling light sources. This sensor means includes a suitable lens (or lenses) which projects the code indicia back into a receiver 351 which has a series of photoelectric sensors adjacent each other, each correlated with potential ones of the code dots on the label. These sensors respond to the presence and absence of the dots in a particular code pattern on each label, as for example the code pattern illustrated in FIGS. 15 and 25 on each label of the exemplary label strip. The indicia markings on each label preferably include a special grouping of dots or the equivalent (FIGS. 15 and 25). These are made up of a select grouping of product control dots **55*a*, 55*b*, 55*c*, and 55*d*; an expiration date printing control dot 57; cut off register dot 54; and label position dots 54 (dual purpose dot) and 54*a*. More specifically, the pharmaceutical company uses a binary code system with dots 55*a–d* for product identification purposes. For example, on a particular product label, dot 55*b* may be the only one printed of 55*a–d* as shown in FIG. 25. (The circles for dots 55*a*, 55*c*, and 55*d*** are intended to show that these are not printed on this particular label). This code normally indicates whether the label on the bottle is the latest revision for the product.

Dot 57 is imprinted on each label with imprinter 13 at the same time the use expiration date is printed on the label. During verification, the presence of dot 57 will establish that the imprinter was operating and did in fact print an expiration date on that label.

Dot 54 assists in label strip advance control as noted previously, and dots 54 and **54*a*** are used to indicate proper or improper positioning of the label on each bottle, as explained hereinafter.

As noted previously, verification is by means 40 of the label after application to the bottle. During verification checking, to be acceptable the labeled bottle must have the correct code in dots **54*a–d* (including the proper printed dot or dots and the proper unprinted dot or dots), must have dot 57 on it, and must have correct alignment and positioning using dots 54 and 54*a*** for position control.

This position control may check the label for lateral position, longitudinal position, and skew position. As shown in FIG. 25 relative to the greatly enlarged label 52, there is a mask in front of the photoelectric sensors and which preferably has triangular shaped mask openings 362 and 364 which are oriented to cause the diagonal leg of each opening to bisect one of the two dots 54 and **54*a* as shown. These sensors, which receive light and dot images reflected from the label, are made responsive only when a bottle is in the verification position so as to be inactive while mechanism 38 is rotating between stations. If a label is properly positioned on the bottle, the light reflected from triangular zone 362** will equal the light reflected from triangular zone 364. If however, the label is out of position, and the code pattern therefore does not match the present spaced positions of these triangles, then the proper light relations will not occur and the label will not be approved, i.e. the unit will not verify its correctness. It therefore will not activate pneumatic pin shifter 302 to shift the pin 300 corresponding to that labeled bottle. Such a bottle would then be discharged through the unacceptable discharge subassembly 42 when the unshifted pin strikes trigger 310 to actuate valve 314 to release the gripper mechanism 37 for that particular bottle and allow the bottle to fall into chute 320. Also, if the label is askew on the bottle, a light balance will not occur between these triangles and the labeled bottle will not be approved and will be discharged in the same way. Also, if the label is laterally shifted out of proper position on the bottle, (FIG. 25), the proper light balance will not occur and the labeled bottle will not be approved for this reason. If the label is longitudinally shifted out of proper position (with respect to the long dimension of the label, but circumferentially on the bottle), the total amount of light detected by the two sensors will not match a predetermined light quantity programmed into the unit so that the bottle will not be acceptable for this reason. Therefore, it will be seen that if the code matches the positions of the triangles to give a proper light balance, if the lateral position and askew position are correct to give a true light balance, and if the label is in its proper longitudinal position with respect to the circumference of the bottle to match a programmed total light reflective value, the bottle will be approved as to these features. If the label is also approved as to the code identification relative to dots 55*a–d*, and approved because of the presence of dot 57, pneumatic actuator 302 will be activated by the sensing subassembly 40 to shift pin 300, so that the gripper for this bottle will not be released until the bottle reaches the acceptable item discharge position. It will be released here because cam 274 shifts each time the unit 38 stops a gripper at this station. The photoelectric sensors that are exposed to dots 55*a–d* are pre-programmed to respond only to the presence of the correct dot or dots and the absence of the others.

Briefly therefore, verification occurs on the bottle, and includes code (for product) verification, imprinter (for expiration date) verification, and position (of label) verification.

Figure 17:
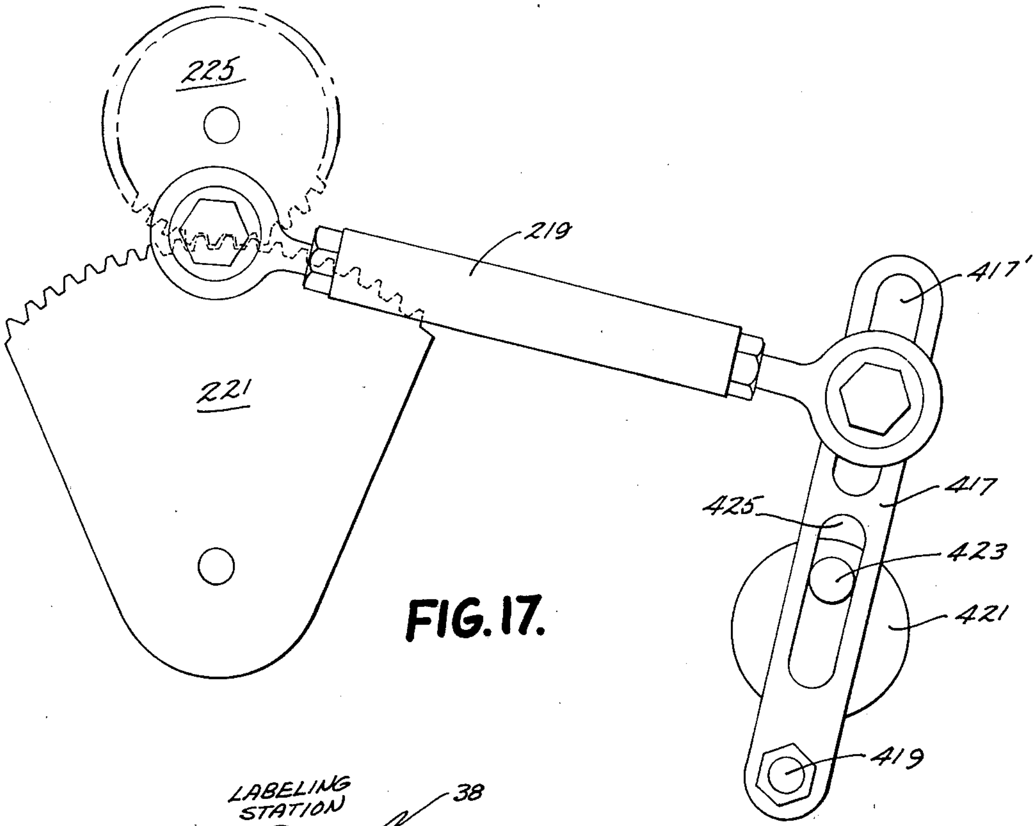
FIG. 17 is an elevational view of a modified form of the main drive components for the label web feed mechanism formed to provide shaper control of the two stage feed cycle.
Figure 18:
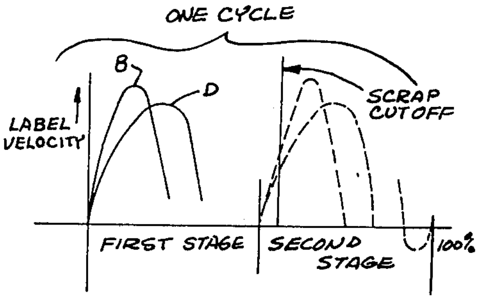
FIG. 18 is a schematic graphical representation of the two stage cycle of the system as controlled in various manners.

In FIG. 17 is disclosed an alternative label feed drive mechanism which effects a controlled shape of the feed cycle. It uses the gear sector 221, spur gear 225 to unit 227, and pitman 219 as previously, by employs a modified crank assembly. Instead of using crank 217 rotating on its shaft 104 as in FIG. 21, a link 217 is pivotally mounted at one end to pin 419 and is oscillated by a uniform motion crank disc 421 having an eccentric pin 423 fitting in slot 425 of link 417. Pitman 219 is adjustable along slot 417' of link 417 to effect varying feed amounts to accommodate different label lengths as encountered on different runs of the machine. By using this cam-oscillated link set up, the curve of the label feed and scrap feed can be changed from the label feed curve B and scrap feed curve C (FIG. 18) to the more desirable label feed curve D and scrap feed curve F. This lengthens the time of forward feed and shortens the time of reverse movement of the gear sector, so that even more accuracy of label tape positioning prior to cutoff can be achieved.

Even without this modification in FIG. 17, however, the apparatus is extremely accurate. It has proven in actual operation to be highly accurate, rapid, dependable, and smooth in its controlled feeding cutting of offset printed label tapes, in its controlled advancement of the container articles to be labeled and the severed coded labels, and in the subsequent verification and handling of such labeled articles.

Those in this art will readily conceive of various alterations in details that could be made in physical embodiments of the invention, and of many different control circuits that could be employed to practice the invention. The invention is therefore intended to be limited only by the scope of the appended claims and the reasonable equivalents thereto.

We claim:

1. Labeling apparatus for elongated articles such as pharmaceutical containers, comprising: label feed means and label applying means; article advancing means comprising rotational wheel means having a plurality of spaced releaseable article gripping means circumferentially therearound, shiftable between an article receiving position, an article labeling position, a label checking position, and an article discharge position, as said wheel means rotates; each of said article gripping means having article-end engaging means shiftable axially, generally parallel to said wheel axis, between a contracted condition to engage articles on their ends and hold them with their axes parallel to said wheel axis and to each other, and an expanded cocked condition to receive or release articles; biasing means to bias said engaging means toward said contracted condition; releaseable latch means to retain said engaging means in cocked expanded condition; release means on said apparatus adjacent said article receiving position of said wheel means arranged to cause release of each of said engaging means for biased movement from cocked expanded condition to contracted condition; and cocking means on said apparatus adjacent said article discharge position to shift each said engaging means against the bias from the contracted condition to the expanded cocked condition for latching.

2. The apparatus in claim 1 including article loading means adjacent said receiving position at said wheel means having an article singulating and advancing pusher shiftable from a first retracted position toward said wheel means to a second position adjacent said article gripping means to load a single article into a receiving gripping means on said wheel means.

3. Labeling apparatus for elongated articles such as pharmaceutical bottles, comprising: label feed means and label applying means; article advancing means comprising rotational wheel means having a plurality of releasable article gripping means therearound spaced radially with respect to the wheel means rotational axis, said wheel means being rotationally shiftable to advance said gripping means between an article receiving position, an article labeling position, a label checking position, and an article discharge position as said wheel means rotates; each of said gripping means being so mounted to said rotational wheel means to continuously retain an article in a fixed given position relative to said wheel means while the article is advanced from said article receiving position through said article labeling position and said article checking position to said article discharge position; said wheel means having a pair of spaced rims forming article receiving space at each of said gripping means; said gripping means each including an article engaging saddle on one of said rims for engaging one end of an article, a spring biased plunger on the second rim, shiftable between a cocked article receiving or releasing position and an article engaging and clamping position, and restraining latch means for each spring biased plunger shiftable between a set position restraining its spring biased plunger in cocked position and a plunger releasing position for releasing its spring biased plunger into article engaging position; means to cock each of said plungers and set its restraining latch means at said article discharge position; and means at said article receiving position to controllably release said plunger from its latch means for gripping an article.

4. Apparatus for applying coded labels to articles and verifying such comprising: article advancing means having a plurality of releasable article gripping means movable through a series of stations; article loading means at the first station, article label applying means at a sugsequent station, label verification checking means at a subsequent station, and labeled article discharge means at a subsequent station, with said gripping means being advanced successively through such stations in the order noted, thereby enabling verification of coded labels after application thereof to the gripped article; and article discharge control means operably associated with said label verification checking means to differentiate between approved and unapproved labeled articles; said article gripping means comprising a plurality of independently actuable gripping mechanisms, and said article discharge control means including (a) a pre-settable control element for each gripping means, shiftable between a triggering position and a non-triggering position, (b) control element shifting means responsive to said verification checking means and (c) article disposition means including trigger means activated by a control element in the triggering position to controllably dispose of the article.

5. The apparatus in claim 4 wherein said article advancing means comprises rotational wheel means having said plurality of gripping mechanisms around its periphery.

6. Apparatus for applying coded labels to articles and verifying such comprising: article advancing means having a plurality of releasable article gripping means movable through a series of stations; article loading means at the first station, article label applying means at a subsequent station, label verification checking means at a subsequent station, and labeled article discharge means at a subsequent station, with said gripping means being advanced successively through such stations in the order noted, thereby enabling verification of coded labels after application thereof to the gripped articles; and article discharge control means operably associated with said label verification checking means to differentiate between approved and unapproved labeled articles; said verification checking means comprising photosensitive detector means preset to be responsive only to a particular set of label code indicia for verification approval or disapproval.

7. Labeling apparatus for a label having a code indicia thereon, comprising: label advancing and applying means; article advancing means having a plurality of releasable article gripping means, movable between an article pick up position, a label applying position, a label registry checking position, and at least one discharge position; each of said gripping means being so mounted relative to said article advancing means to continuously retain an article in a fixed given position relative to said article advancing means while the article is advanced from said article pick up position through said label applying position and said label registry checking position to said discharge position; photosensitive label alignment and label verification checking means at said label registry checking position capable of scanning the label code and differentiating between acceptable articles with aligned properly coded labels and defective articles with non-aligned and/or improperly coded labels; camming means to actuate each of said article gripping means at said pick up station; camming means to release each of said article gripping means at a discharge station; defective article kick out means adjacent the discharge station; and actuator means for said kick out means operably associated with said label registry checking means to controllably actuate said kick out means in response to the detection of a defectively labeled article.

8. The apparatus in claim 7 wherein said actuator means for said kick out means includes trigger means at said discharge position, a plurality of shiftable trigger operators on said article advancing means, one for each article gripping means, and trigger operator shifting means at said checking position; said label alignment checking means being operably associated with said trigger operator shifting means to selectively shift said trigger operators for controllably triggering said trigger means.

9. The apparatus in claim 8 wherein said article advancing means comprises a rotational wheel, said trigger means comprises switch means, and said trigger operators comprise shiftable pins on said wheel.

10. A labeling machine comprising: label tape feed means for intermittently feeding a continuous tape of repeat pattern labels and periodic scrap sections; powered label cut-off means forming a cut-off station to receive successive portions of a label tape from said feed means and shiftable to cut individual labels and scrap sections from the tape; said feed means including a one-way rotary drive clutch means operably connected to and driven from reciprocable gear sector means, said gear sector means being operably connected to a pitman which in turn is pivotally connected to an oscillatory pivotal link, said pivotal link having an elongated slot receiving an eccentric drive pin of a continuously rotating crank, for effecting shaped drive strokes.

11. Apparatus for applying labels to articles and verifying the labels on the articles, comprising a label applying station, means for feeding articles to and past said label applying station and through a second inspection station at which label inspection takes place after complete attachment of the labels to articles, said feeding means including retaining means for holding such articles in a fixed given position relative to said feeding means while in said label applying station during the application of labels thereto and while passing therefrom, and to and through said second inspection station, means for feeding labels to said label applying station and for applying the same to articles held at such label applying station, means at said second inspection station for inspecting the label bearing areas of articles that have been fed to said label applying station for application of labels thereto while said articles are being held in said given position by said article feeding and holding means, and means selectively controlled by said inspecting means and operative by the latter whenever the label of an inspected article does not pass such inspection, to exercise a supervisory action on the article not passing such label inspection.

12. Apparatus as defined in claim 11, in which said inspection means is constructed and arranged to make a linear inspection of a given linear portion of a label held in a given position by said article feeding and holding means, and to reject such article if such given linear portion of the label thereof is offset from such fixed position.

13. Apparatus as defined in claim 12, in which said inspection means is constructed and arranged to make a linear inspection of two widely spaced apart markings on the label.

14. Apparatus as defined in claim 11, in which said selectively controlled means comprises means for separating an article not passing such label inspection from the other labeled articles.

15. Apparatus as defined in claim 11, including a first means for accurately locating a plurality of spaced markings on a label, and in which said label feeding and applying means are constructed and arranged to accurately locate a label in given relation on an article.

* * * * *